(12) United States Patent
Kanbe

(10) Patent No.: US 6,636,341 B2
(45) Date of Patent: Oct. 21, 2003

(54) ELECTROPHORETIC DISPLAY DEVICE, METHOD OF MANUFACTURING ELECTROPHORETIC DISPLAY DEVICE AND ELECTRONIC APPARATUS

(75) Inventor: Sadao Kanbe, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/003,473

(22) Filed: Oct. 23, 2001

(65) Prior Publication Data
US 2002/0166771 A1 Nov. 14, 2002

(30) Foreign Application Priority Data
Oct. 27, 2000 (JP) ........................ 2000-329519
Oct. 19, 2001 (JP) ........................ 2001-322465

(51) Int. Cl.$^7$ .................. G02B 26/00; G09G 3/34; H01J 9/24; G01N 27/453
(52) U.S. Cl. .................. 359/296; 345/107; 445/24; 204/600
(58) Field of Search .................. 359/296, 452, 359/253; 345/107, 105, 108, 84; 445/24; 204/600

(56) References Cited

U.S. PATENT DOCUMENTS

| | | | |
|---|---|---|---|
| 4,620,916 A | * | 11/1986 | Zwemer et al. ............ 359/296 |
| 2002/0113770 A1 | * | 8/2002 | Jacobson et al. ............ 345/107 |
| 2002/0151246 A1 | * | 10/2002 | Ikeda et al. ............ 445/24 |

* cited by examiner

Primary Examiner—Loha Ben
Assistant Examiner—William Choi
(74) Attorney, Agent, or Firm—Harness, Dickey & Pierce, P.L.C.

(57) ABSTRACT

A method is provided for manufacturing an electrophoretic display device that includes a pair of substrates and a rib that partitions a space into a plurality of cells. The method comprises the steps of applying a liquid included in common by all the cells by using an application device, and allowing a discharge device to separately discharge a plurality of liquids so that the liquids differ in composition with respect to each of the plurality of cells and thereby fill in respective cells.

21 Claims, 6 Drawing Sheets

1; Discharge Opening
2; Colored Ink
3; Discharged Ink
4; Rib
5; Applied Ink
6; ITO Transparent Electrode
7; TFT Substrate

[FIG. 1]
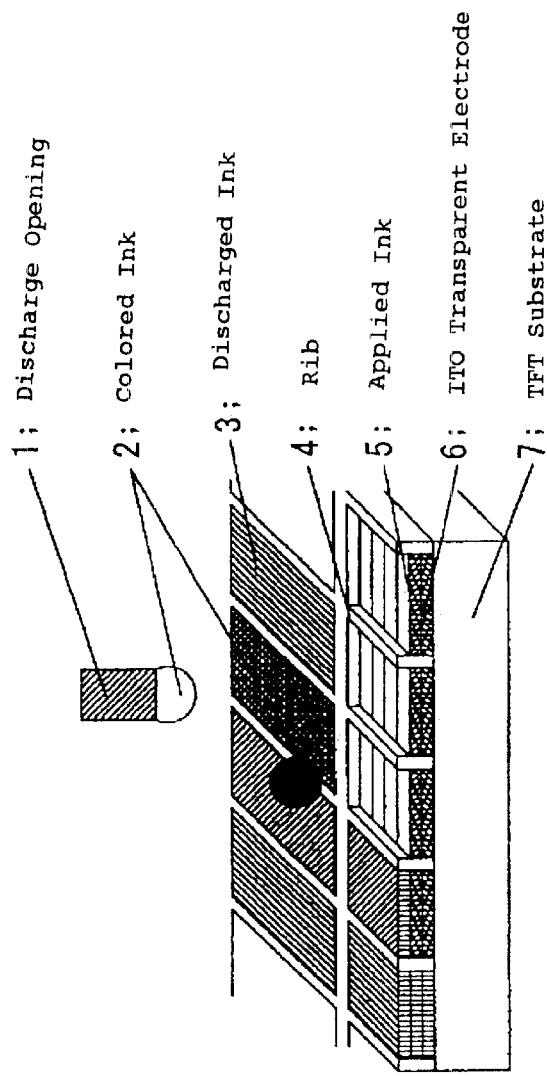
1; Discharge Opening
2; Colored Ink
3; Discharged Ink
4; Rib
5; Applied Ink
6; ITO Transparent Electrode
7; TFT Substrate
[FIG. 2]
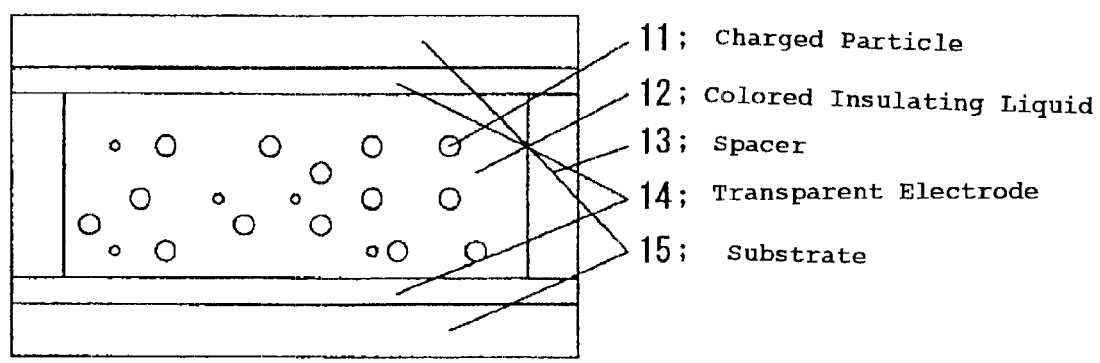
11; Charged Particle
12; Colored Insulating Liquid
13; Spacer
14; Transparent Electrode
15; Substrate

[FIG. 3]
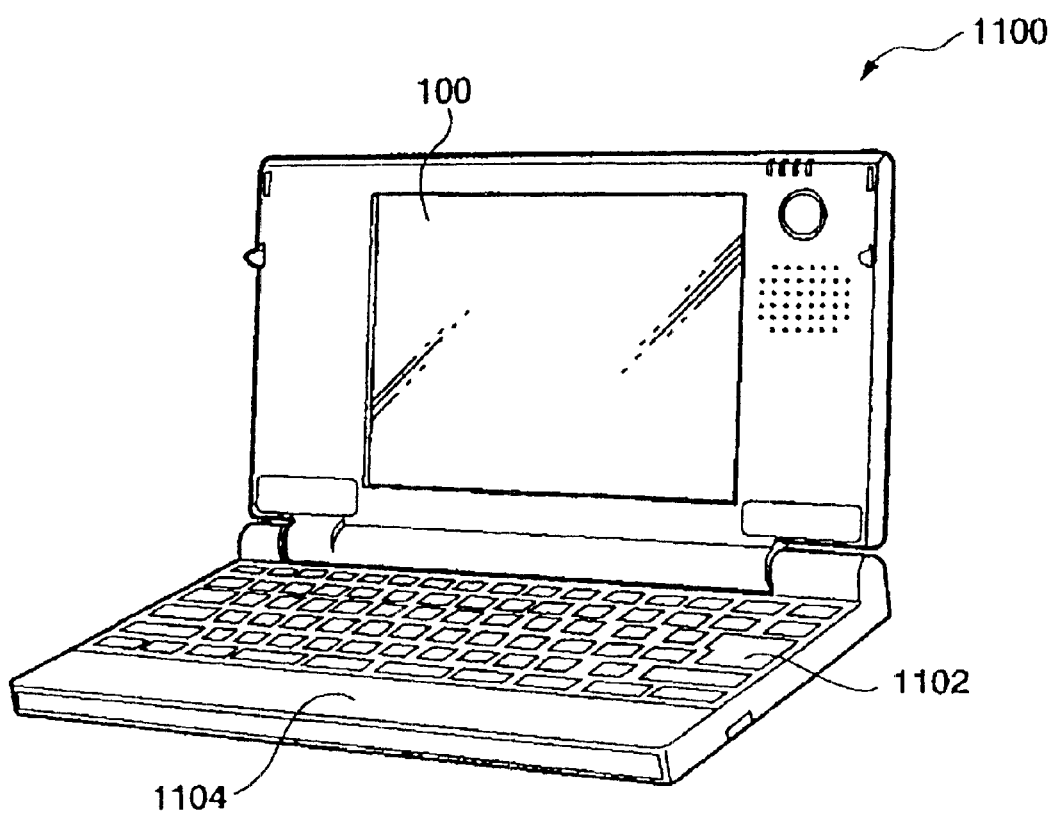

[FIG. 4]
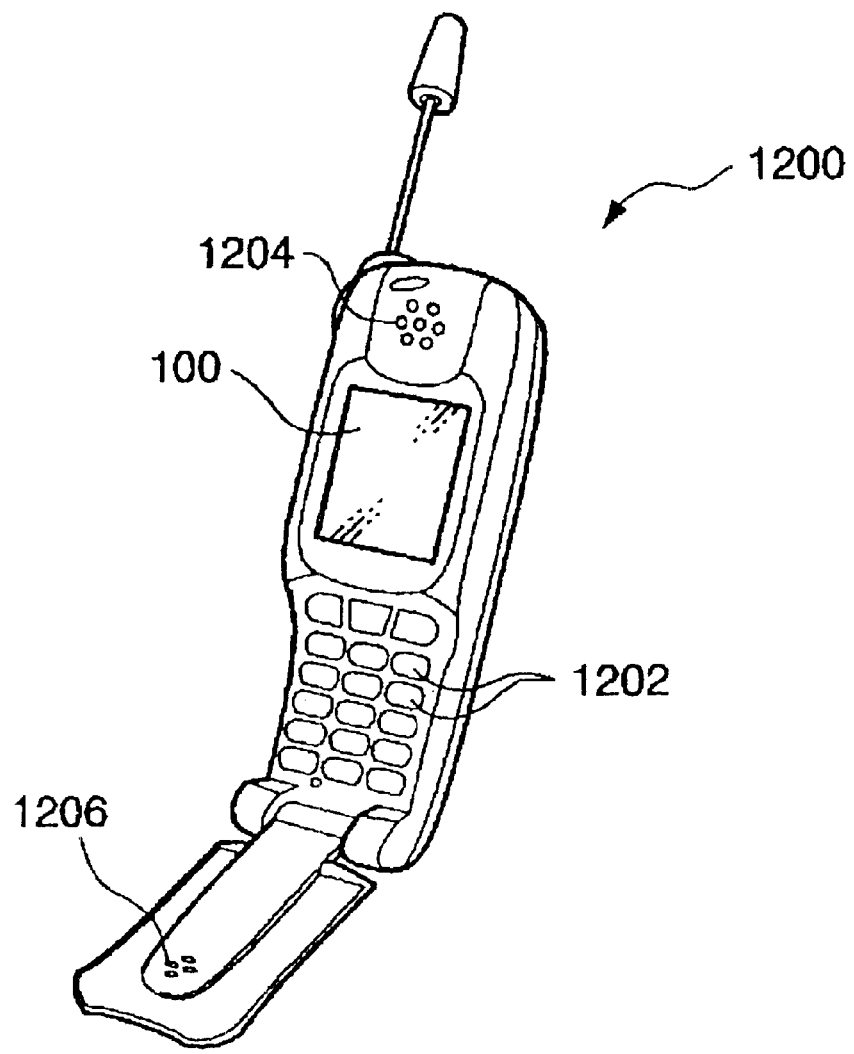

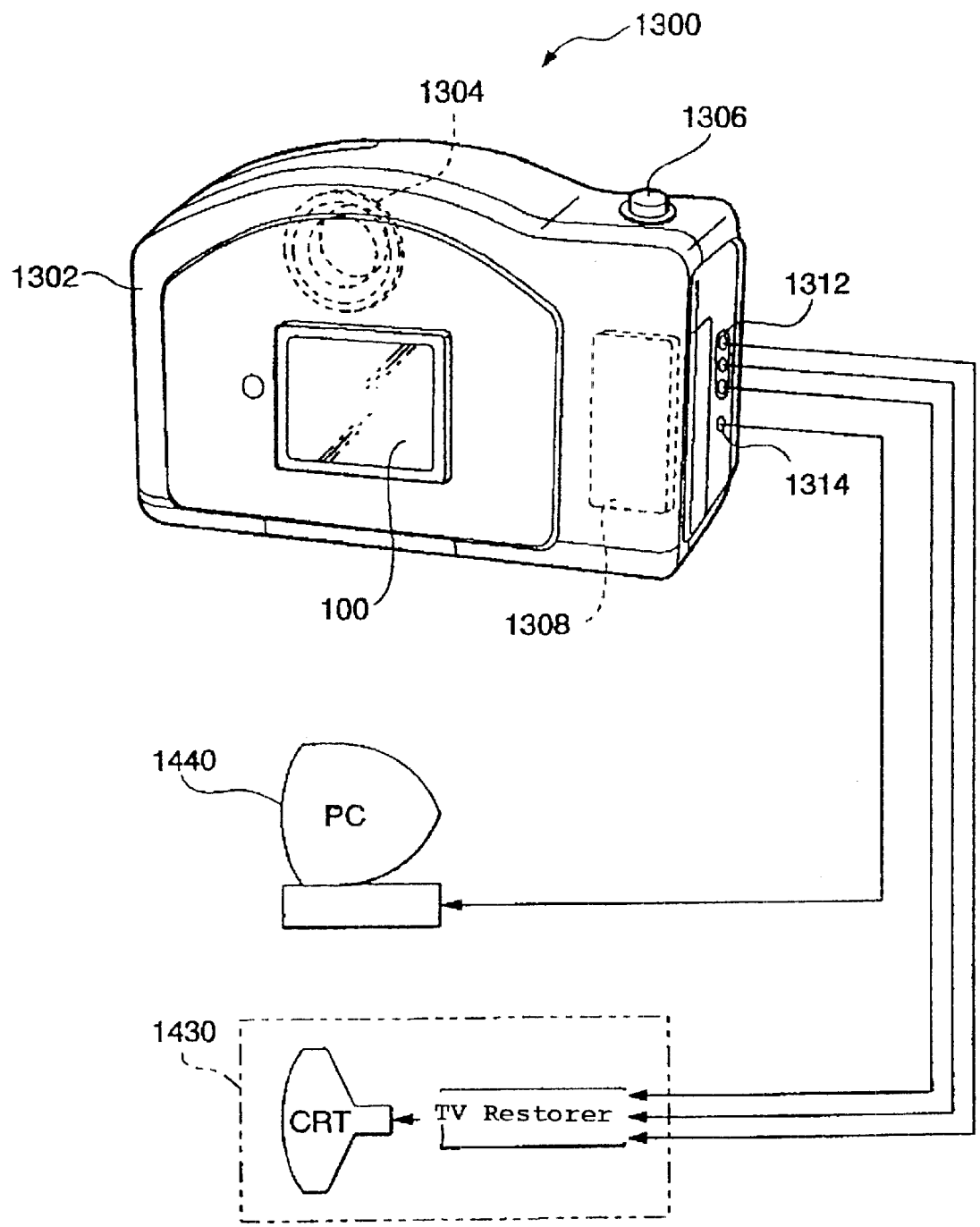

[FIG. 6]
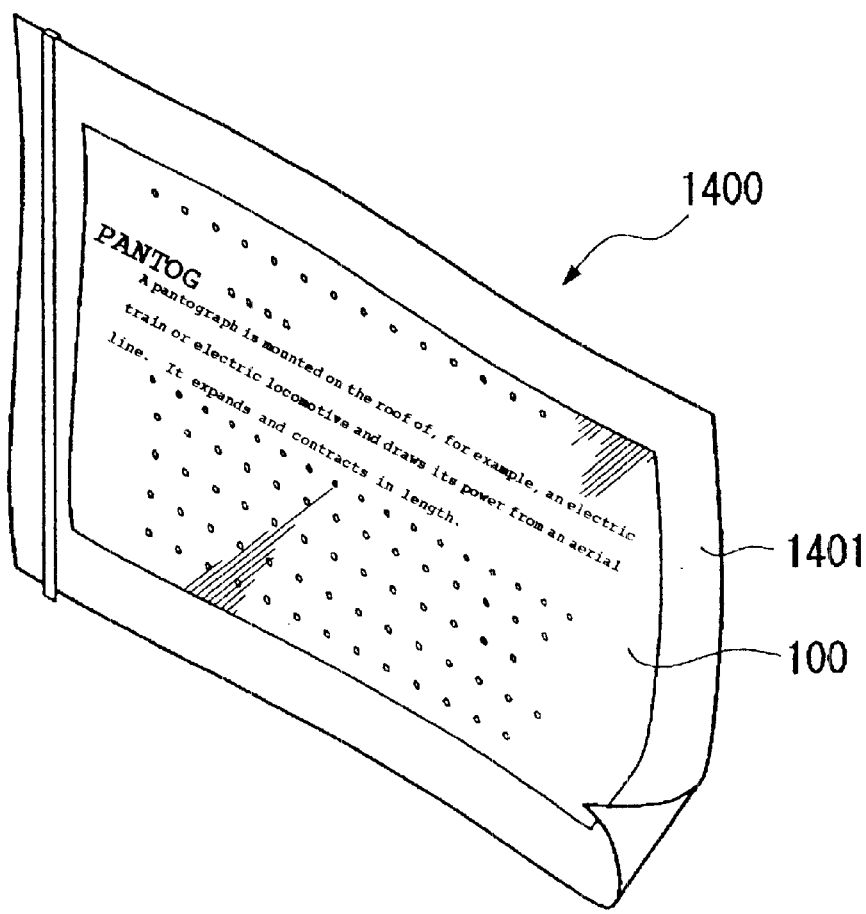
[FIG. 7]
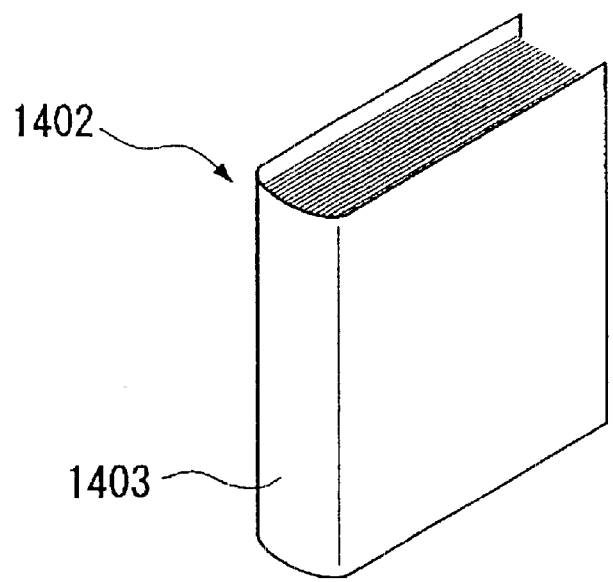

[FIG. 8]
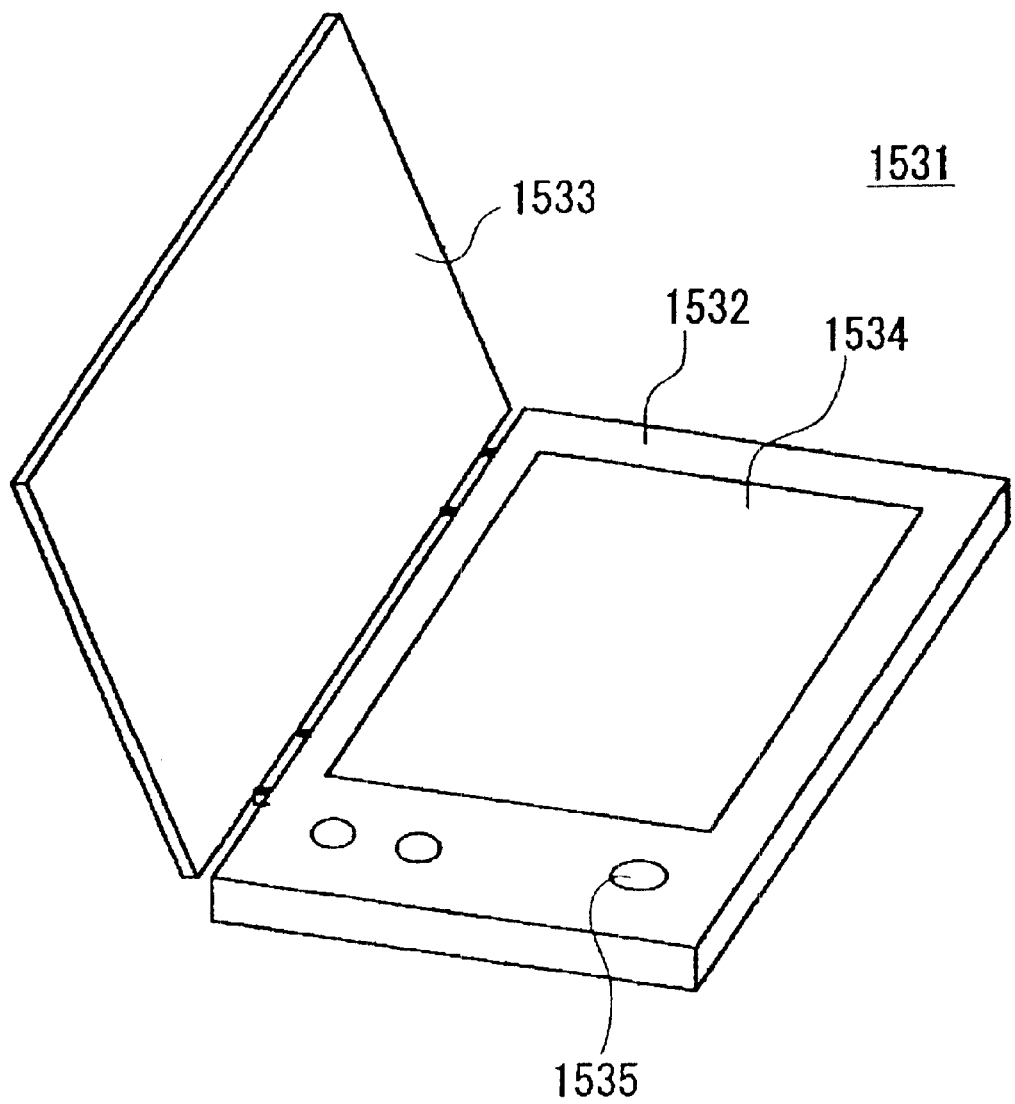

ELECTROPHORETIC DISPLAY DEVICE, METHOD OF MANUFACTURING ELECTROPHORETIC DISPLAY DEVICE AND ELECTRONIC APPARATUS

TECHNICAL FIELD

The present invention relates to an electrophoretic display device, to a method of manufacturing an electrophoretic display device and to an electronic apparatus.

BACKGROUND OF THE INVENTION

With a rapid development in mobile data apparatus in recent years, increased demands have been made on power-thrifty and thin display devices. To meet these demands, various attempts have been made on development of techniques. Liquid crystal displays hitherto have met the demands.

However, in these liquid crystal displays, letters or characters become hard to read at some viewing angles to see a screen or due to reflected light, and light sources flicker. These problems place a burden on the visual sense and have not sufficiently been solved. Accordingly, researches on display devices that place a reduced burden on the visual sense have been made.

Reflective display devices are expected as a possible candidate for such display devices that consume reduced power and place a reduced burden on eyes. An electrophoretic display device (U.S. Pat. No. 3,612,758) is known as one of these reflective display devices.

FIG. 2 shows the principle of operation of the electrophoretic display device. This display comprises a dispersion liquid, a pair of transparent electrodes 14 and substrate 15 facing each other and sandwiching the dispersion liquid. The dispersion liquid comprises charged particles 11 and a colored insulating liquid 12. The charged particles 11 are particles bearing electrical charges, and the colored insulating liquid 12 contains a colored pigment dissolved therein.

The charged particles serving as electrophoretic particles bearing electrical charges are attracted to an electrode having an opposite polarity by applying a voltage through the electrodes. A display is produced by contrast between the color of the charged particles (electrophoretic particles) and the color of the colored insulating liquid. A desired display can be produced by forming one of the electrodes into a desired shape.

Specifically, when a voltage with some polarity is applied, for example, white charged particles (electrophoretic particles) are attracted to an electrode that is closer to a viewer, and a white display in a desired shape is produced against a background with the color of the colored insulating liquid. In contrast, when a voltage with the opposite polarity is applied, the charged particles are attracted to the opposite electrode, thereby allowing the viewer to recognize the color of the colored insulating liquid.

The electrophoretic display device was prepared by a process in which two plies of substrates 15, each carrying an electrode, were bonded together with the interposition of spacers 13, and thereby cells were formed. The resulting cells were filled with the dispersion liquid by making use of a capillary phenomenon.

However, such a conventional electrophoretic display device can only produce a binary display, i.e., a display by contrast between one pair of colors of a colored liquid and of charged particles, since a multiplicity of dispersion liquids with a multiplicity of colors cannot be disposed adjacent to each other. As a possible solution to this disadvantage, a process has been proposed in which several types of colored solutions (inks) containing dispersed charged particles are respectively discharged by an ink jet process. However, according to this process, the dispersion liquid contains the charged particles dispersed therein, and the discharged particles are liable to settle and cause clogging of nozzles.

DISCLOSURE OF INVENTION

SUMMARY OF THE INVENTION

The present invention has been accomplished to solve the above problems and to provide a method of manufacturing an electrophoretic display device that produces a display in multiple colors.

Specifically, a method of manufacturing an electrophoretic display device in accordance with the present invention comprises a pair of substrates and a rib that partitions a space into a plurality of cells, each filled with a liquid containing charged particles. The method comprises the steps of applying a liquid included in common by all the cells by using an application device, and allowing a discharge device to separately discharge a plurality of liquids so that the liquids differ in composition with respect to each of the plurality of cells and thereby fill in respective cells.

In the method of manufacturing an electrophoretic display device, the liquid included in common by all the cells is preferably a dispersive liquid. The dispersive liquid is preferably a liquid containing charged particles dispersed therein. Additionally, the discharged particles are preferably white particles and are preferably titanium dioxide particles.

The liquid included in common by all the cells is preferably a mixed solution containing a low boiling point solution and a high boiling point solution.

In the method of manufacturing an electrophoretic display device, the liquids that differ in composition with respect to each of the plurality of cells are preferably liquids each containing a dye dissolved therein.

In the method of manufacturing an electrophoretic display device, one of the pair of substrates is preferably a TFT substrate comprising a thin-film transistor formed thereon.

In the method of manufacturing an electrophoretic display device, the rib preferably comprises a material having rubber-like elasticity. The rib preferably comprises a material repellent to the liquid included in common by all the cells.

In the method of manufacturing an electrophoretic display device, the discharge device is preferably an ink jet device.

To solve the above problems, an electrophoretic display device of the present invention is manufactured by any of the methods of manufacturing an electrophoretic display device as described above.

An electronic apparatus of the present invention comprises the electrophoretic display device.

BRIEF DESCRIPTION OF THE DRAWINGS

FIG. 1 is a process chart of a method of manufacturing an electrophoretic display device of the present invention.

FIG. 2 is a sectional view of an electrophoretic display device.

FIG. 3 is a perspective view showing the configuration of a personal computer as an embodiment of electronic apparatus of the present invention.

FIG. 4 is a perspective view showing the configuration of a mobile phone as an embodiment of the electronic apparatus.

FIG. 5 is a perspective view showing the rear configuration of a digital still camera, as an embodiment of the electronic apparatus.

FIG. 6 is a perspective view showing the configuration of an electronic paper as an embodiment of the electronic apparatus.

FIG. 7 is a perspective view showing the configuration of an electronic notebook as an embodiment of the electronic apparatus.

FIG. 8 is a perspective view showing the configuration of an electronic book as an embodiment of the electronic apparatus of the present invention.

| (Reference Numerals) | |
|---|---|
| 1: | discharge opening |
| 2: | colored ink |
| 3: | discharged ink |
| 4: | rib |
| 5: | applied ink |
| 6: | ITO transparent electrode |
| 7: | TFT substrate |
| 11: | charged particle |
| 12: | colored insulating liquid |
| 13: | spacer |
| 14: | transparent electrode |
| 15: | substrate |

Embodiments

DETAILED DESCRIPTION

"Electrophoretic Display Device and Method of Manufacturing Electrophoretic Display Device".

The electrophoretic display device of the present invention can be manufactured by the following method of manufacturing an electrophoretic display device of the present invention.

Initially, a rib comprising a grid-shaped projection is formed on a substrate having a plurality of electrodes. Each of the electrodes can independently be driven.

An electrophoretic liquid (hereinafter referred to as "dispersive liquid") is applied into a plurality of cells, and a required amount of a solution is dried. The plurality of cells are composed of a plurality of depressions formed by the grid-shaped projection. The dispersive liquid serves as a liquid included in common by all the cells and comprises an insulating liquid containing charged particles (electrophoretic particles) dispersed therein.

Next, inks in multiple colors each containing a dye dispersed therein (corresponding to "liquids each containing a dye dissolved therein" in the claims, hereinafter referred to as "colored liquids"), which are liquids that differ in composition with respect to each of the plurality of cells, are separately discharged to and charged into respective depressions by using a discharge device.

Subsequently, a substrate comprising a counter electrode is bonded with the above-prepared substrate, thereby allowing the electrophoretic display device to be obtained.

By this procedure, the dispersive liquid containing the charged particles is charged into the cells via no discharge device, and clogging can be prevented.

In addition, the dispersive liquid and the colored liquid are ultimately mixed in the respective cells to achieve the intended objects.

In this method, the dispersive liquid may comprise colored discharged particles and a colorless optically opaque insulating liquid or may comprise discharged white particles and a colored insulating liquid. In general, white particles or black particles are used as the charged particles.

The insulating liquid can be selected depending on the type of the discharged particles and may be a polar solvent such as water-based or alcohol-based solvents. In general, the insulating liquid is preferably a benzene-based nonpolar solvent. It may be a mixed solution containing a low boiling point solvent and a high boiling point solvent. In this case, it is also effective that the low boiling point solvent alone is vaporized, and each colored liquid is then discharged by the same amount as for the vaporized low boiling point solvent to fill in the cells.

The charged particles include, for example, particles of zinc oxide, barium sulfate, titanium oxides, chromium oxides, calcium carbonate, gypsum, white lead, manganese violet, carbon black, iron black, iron blue (Prussian blue), ultramarine blue, phthalocyanine blue, chrome yellow, cadmium yellow, lithopone, molybdate orange, fast yellow, benzimidazoline yellow, flavanthrone yellow, naphthol yellow, benzimidazolone orange, perinone orange, iron oxide red, cadmium red, madder lake, naphthol red, dioxazine violet, phthalocyanine blue, alkali blue, cerulean blue, emerald green, phthalocyanine green, pigment green, cobalt green, and aniline black. These materials are subjected to an appropriate treatment, as appropriate, and dispersed in the insulating liquid (solvent). The resulting dispersion liquid can be used as the dispersive liquid and can be applied by coating.

The colored liquid can be prepared in the following manner. Initially, a solvent that is miscible with the insulating liquid containing the charged particles dispersed therein is selected, and a dye and other ingredients soluble in the solvent are solved in the solvent.

Conventional solvents can be employed as such a solvent. However, the solvent preferably has a boiling point as high as possible, as the resulting colored liquid is discharged from a discharge device, and the concentration of ingredients due to vaporization of the solvent and the clogging of discharge openings should be avoided. Ethylene glycol, N-methylpyrrolidone, and other solvents or mixtures of these solvents can be used as the polar solvents. Alkylbenzenes with a high boiling point can advantageously be used as the nonpolar solvents. Among them, dodecylbenzene and hexlbenzne are, for example, preferred for their costs and availability. Mixtures of these solutions can also be used.

Materials for constituting the grid-shaped rib (protrusion) include any materials that can form ribs. The material preferably has rubber-like elasticity and resiliently deforms, since a pressure is applied onto the two substrates facing each other to avoid migration of liquids between cells. Among them, silicone resins are specifically preferred.

Patterns of the rib include, for example, a closest-packed honeycomb pattern or circular pattern and a closest-packed triangular pattern, in addition to the grid-shaped pattern.

The dispersive liquid is preferably not present on the rib after the application of the dispersive liquid. Accordingly, the material for constituting the rib should preferably be repellent to the dispersive liquid. To this end, the surface of the rib may be subjected to treatment to make the surface repellent to the dispersive liquid.

To regulate the amount of each solution charged into each cell, the following procedure is effective. Initially, a low boiling point solvent is mixed with a high boiling point solvent in a predetermined proportion, such that the dispersive liquid is created, the resulting dispersive liquid is applied by using an application device to the same height with that of the rib, and the low boiling point solvent is then vaporized.

By this procedure, the amounts and proportions of the dispersive liquids in the cells can be held constant.

As the discharge device, a dispenser and an ink jet device can be used, but the ink jet device that can minutely be controlled is preferred.

"Electronic Apparatus"

Next, embodiments of the electronic apparatus of the present invention comprising the electrophoretic display device of the present invention will be described.

<Mobile Computer>

Initially, an embodiment, in which the electrophoretic display device according to the above embodiment is applied to a mobile personal computer, will be illustrated. FIG. 3 is a perspective view showing the configuration of the personal computer. With reference to FIG. 3, the personal computer 1100 comprises a main unit 1104 and a display unit. The main unit 1104 includes a keyboard 1102, and the display unit includes the aforementioned electrophoretic display device 100.

<Mobile Phone>

Next, an embodiment, in which the electrophoretic display device according to the above embodiment is applied to a display unit of a mobile phone, will be illustrated. FIG. 4 is a perspective view showing the configuration of the mobile phone. With reference to FIG. 4, the mobile phone 1200 includes the aforementioned electrophoretic display device 100 in addition to a plurality of push buttons 1202, an ear piece 1204 and a mouthpiece 1206.

<Digital Still Camera>

In addition, a digital still camera using the electrophoretic display device according to the embodiment as a viewfinder will be illustrated. FIG. 5 shows a perspective view of the configuration of the digital still camera and also schematically shows the connection with external apparatuses.

In conventional cameras, a film is exposed to the optical image of a subject. In contrast, in the digital still camera 1300, the optical image of a subject is photoelectrically converted by using an imaging element such as a CCD (charge coupled device), and an imaging signal is created. In this configuration, a case 1302 of the digital still camera 1300 comprises the electrophoretic display device 100 on the back, and a display is produced based on the imaging signal from CCD. Accordingly, the electrophoretic display device 100 serves as a viewfinder showing the subject. The case 1302 also comprises a light receiving unit 1304 including, for example, optical lenses and CCD on the observing side (on the opposite side in FIG. 5).

A cameraman checks the image of the subject shown in the electrophoretic display device 100, pushes down a shutter-release button 1306, and an imaging signal from CCD at that point in time is transmitted to and stored in memory of a circuit board 1308. This digital still camera 1300 includes video signal output terminals 1312 and an input/output terminal 1314 for data communications on the side of the case 1302. In the configuration shown in FIG. 5, a television monitor 1430 and a personal computer 1430 are connected to the former video signal output terminals 1312 and to the latter input/output terminal 1314 for data communications, respectively, according to necessity. The imaging signal stored in memory of the circuit board 1308 is outputted to the television monitor 1430 and/or the personal computer 1440 by a predetermined operation.

<Electronic Paper>

Next, an embodiment, in which the electrophoretic display device according to the above embodiment is applied to a display unit of an electronic paper, will be illustrated. FIG. 6 is a perspective view showing the configuration of the electronic paper. With reference to FIG. 6, the electronic paper 1400 includes a main unit 1401 and a display unit. The main unit 1401 comprises a rewritable sheet having texture and flexibility similar to paper, and the display unit comprises the aforementioned electrophoretic display device 100.

FIG. 7 is a perspective view showing the configuration of an electronic notebook. With reference to FIG. 7, the electronic notebook 1402 includes bundled plural plies of the electronic paper 1400 shown in FIG. 7 and a jacket 1403 sandwiching the electronic paper 1400. When the electronic notebook 1402 includes a display data input means in the jacket 1403, the display of the electronic paper 1400 can be changed while the plural plies of the electronic paper 1400 are bundled.

<Electronic Book>

Next, an embodiment, in which the electrophoretic display device according to the above embodiment is applied to an electronic book, will be illustrated. FIG. 8 is a perspective view showing the configuration of the electronic book.

With reference to FIG. 8, the reference numeral 1531 represents the electronic book. The electronic book 1531 includes a book-shaped frame 1532 and a cover 1533 that is reclosable with respect to the frame 1532. The frame 1532 includes a display device 1534 and an operation unit 1535. The display device 1534 comprises the aforementioned electrophoretic display device in such a manner that a display screen is exposed to the surface The electronic apparatus include, for example, liquid crystal television sets, viewfinder-type or monitor-direct-vision type video tape recorders, car navigation devices, pagers, electronic organizers, electronic calculators, word processors, workstations, visual telephones, POS terminals, and apparatus including touch panels, in addition to the personal computer shown in FIG. 3, mobile phone shown in FIG. 4, digital still camera shown in FIG. 5, electronic paper shown in FIG. 6, electronic notebook shown in FIG. 7, and electronic book shown in FIG. 8. Needless to say, the aforementioned electrophoretic display device can be applied as a display unit to these electronic apparatus.

The present invention will be illustrated in further detail with reference to several examples below.

EXAMPLE 1

FIG. 1 is a diagram showing part of steps of the method of manufacturing an electrophoretic display device of the present invention. With reference to FIG. 1, liquid dodecylbenzene (dispersive liquid) containing titanium dioxide fine particles dispersed therein is applied to one of the substrates of the electrophoretic display device, part of dodecylbenzene is removed by drying, and colored liquids each containing a yellow, magenta or cyan dye dissolved therein are then discharged, respectively, by using an ink jet device (discharge device).

In FIG. 1, the reference numeral 1 is a discharge opening, the reference numeral 2 is a colored ink (colored liquid), the reference numeral 3 is a discharged ink, the reference numeral 4 is a rib (partitioning), the reference numeral 5 is an applied ink (dispersive liquid), i.e., the dodecylbenzene solution containing the titanium dioxide powder (charged particles) dispersed therein, the reference numeral 6 is an ITO transparent electrode, and 7 is a TFT substrate.

Each of the ITO transparent electrodes 6 is independent, and each of the electrodes 6 and 6 is connected to the TFT element 7 respectively and is independently energized.

Initially, a resist was applied to a thin film transistor element substrate (TFT glass substrate) prepared in the same manner as in a TFT substrate for use in a liquid crystal display. The TFT element substrate was then subjected to exposure and developing processes, and a concave grid-like pattern of the target rib 4 was obtained.

Next, a two-pack setting silicone resin (available from Toshiba Silicone Corporation, under the trade names of TSE 3450 (A) and TSE 3450 (B)) was charged into the resulting depression (resist portion), was then cured, and thereby the rib 4 was formed. Subsequently, the resist portion was removed by peeling so that the convex rib 4 was formed. The rib 4 had a height of 50 μm, a width of 10 μm and a rib pitch (partitioning pitch) of 60 μm and extended in two dimensions.

A dispersive liquid (xylene/dodecylbenzene =1/1, by volume) containing 10% by weight of titanium dioxide particles dispersed therein was applied to the TFT substrate 7 by using a coater. After the application, the applied liquid was allowed to stand to remove xylene. The titanium dioxide particles had been subjected to treatment to have hydrophobicity.

After removing xylene, colored liquids 2 (insulating liquids) each being colored to yellow, magenta or cyan, respectively, were separately discharged into the rib 4 by using an ink jet device (obtained by modifying a commercially available ink jet printer). The colored liquids 2 were prepared from dodecylbenzene solutions each containing 1% by weight of MS yellow VP, MS Magenta VP, or MS Cyan VP (trade names, available from Mitsui Toatsu Dyes Ltd.).

The colored liquids 2 could stably be discharged, since the colored liquids contained completely dissolved dyes, exhibited no precipitate of ingredients and did not invite, for example, clogging of nozzles. After separate discharge of the colored liquids 2, a glass substrate comprising an ITO on its entire surface was bonded with the TFT substrate 7, and the periphery of the substrates was then sealed with an epoxy resin under a load. Accordingly, an electrophoretic display device was formed.

Terminals on the TFT glass substrate were connected to a power source, and the electrophoretic display device was driven. As a result, the device could be driven in multiple colors such as yellow, magenta, cyan and white. A display of a mixture of these colors could also be produced.

EXAMPLE 2

An electrophoretic display device was manufactured in the same manner as in Example 1, except that the charged particles (titanium dioxide) used in Example 1 were replaced by aniline black fine powders.

EXAMPLE 3

Initially, a polyimide resist was applied to a thin film transistor element substrate (TFT glass substrate) previously prepared in the same manner as in a TFT substrate for use in a liquid crystal display. The TFT element substrate was subjected to exposure and developing processes, and thereby a convex (rib-like) grid-like pattern was obtained in a similar manner to Example 1. The resulting rib had a grid-like shape and had a height of 50 μm, a width of 10 μm and a rib pitch (partitioning pitch) of 60 μm and extended in two dimensions.

Next, the substrate was subjected to plasma treatment in an atmosphere of carbon tetrafluoride at atmospheric pressure, and thereby the protrusion constituting the rib was fluoridized.

A dispersive liquid (xylene/dodecylbenzene=1/1, by volume) containing 10% by weight of titanium dioxide particles dispersed therein was applied to the substrate by using a coater. After the application, the applied liquid was allowed to stand to remove xylene. The titanium dioxide particles had been subjected to treatment to have hydrophobicity. The dispersive liquid satisfactorily drained off from the rib as compared with Example 1.

After removing xylene, colored liquids (insulating liquids) being colored to yellow, magenta or cyan, respectively, were separately discharged into the rib by using an ink jet device (obtained by modifying a commercially available ink jet printer).

As the colored liquids, the same colored liquids used in Example 1 were used.

After separate discharge of the colored liquids, a glass substrate comprising an ITO on its entire surface was bonded with the TFT substrate, and the periphery of the substrates was then sealed with an epoxy resin under a load. An electrophoretic display device was then formed.

Terminals on the TFT glass substrate were connected to a power source, and the electrophoretic display device was driven. As a result, the device could be driven in multiple colors such as yellow, magenta, cyan and white. A display of a mixture of these colors could also be produced.

Comparative Example

A solution was prepared by dispersing the charged particles (titanium dioxide) used in Example 1 in dodecylbenzene containing a dye dissolved therein. The solution was discharged by the ink jet process but could not stably be discharged for a long time.

EXAMPLE 4

The electrophoretic display device obtained in Example 1 was assembled into a display unit of a mobile phone instead of an originally mounted liquid crystal display. The circuit of the mobile phone was changed, for example, by mounting a step-up circuit, and the resulting mobile phone was driven. The resulting mobile phone could produce a display in multiple colors easy to see.

Advantages

As is described above, according to the method of manufacturing an electrophoretic display device of the present invention, a liquid included in common by all the cells is applied, and liquids that differ in composition with respect to each cell are separately discharged into respective cells by using a discharge device such as one according to the ink jet process. By this configuration, an electrophoretic display device with multicolored display can be manufactured without clogging. It is a known fact that development in such multicolor displays can achieve full-color displays.

What is claimed is:

1. A method of manufacturing an electrophoretic display device, the electrophoretic display device comprising a pair of substrates and a rib that partitions a space into a plurality of cells, each cell is filled with a liquid containing charged particles, the method comprising the steps of:

applying a liquid included in common by all the cells by using an application device; and allowing a discharge device to separately discharge a plurality of liquids so that the liquids differ in composition with respect to each of the plurality of cells and thereby fill in respective cells.

2. The method of manufacturing an electrophoretic display device according to claim 1, wherein the liquid included in common by all the cells is a dispersive liquid.

3. The method of manufacturing an electrophoretic display device according to claim 2, wherein the dispersive liquid is a liquid containing charged particles dispersed therein.

4. The method of manufacturing an electrophoretic display device according to claim 3, wherein the charged particles are white particles.

5. The method of manufacturing an electrophoretic display device according to claim 4, wherein the charged particles are titanium dioxide particles.

6. The method of manufacturing an electrophoretic display device according to claim 1, wherein the liquids that differ in composition with respect to each of the plurality of cells are liquids, each containing a dye dissolved therein.

7. The method of manufacturing an electrophoretic display device according to claim 1, wherein the liquid included in common by all the cells is a mixed solution containing a low boiling point solution and a high boiling point solution.

8. The method of manufacturing an electrophoretic display device according to claim 1, wherein one of the pair of substrates is a TFT substrate bearing a thin-film transistor formed thereon.

9. The method of manufacturing an electrophoretic display device according to claim 1, wherein the rib comprises a material having rubber-like elasticity.

10. The method of manufacturing an electrophoretic display device according to claim 1, wherein the rib comprises a material that is repellent to the liquid included in common by all the cells.

11. The method of manufacturing an electrophoretic display device according to claim 1, wherein the discharge device is an ink jet device.

12. An electrophoretic display device being manufactured by the method of manufacturing an electrophoretic display device as claimed in claim 1.

13. An electronic apparatus comprising the electrophoretic display device as claimed in claim 12.

14. A method of manufacturing an electrophoretic display device comprising:

providing a substrate including a plurality of partitioned cells;

applying at least one liquid to said plurality of partitioned cells; and separately discharging a composition containing a liquid into each of said plurality of partitioned cells with a discharge device;

wherein the at least one liquid further comprises a mixed solution containing a low boiling point solution and a high boiling point solution.

15. A method of manufacturing an electrophoretic display device comprising:

providing a substrate including a plurality of partitioned cells;

applying at least one liquid to said plurality of partitioned cells; and discharging a first composition containing a liquid into one of said plurality of partitioned cells with a discharge device; and discharging a second composition containing a liquid into another of said plurality of partitioned cells, wherein the first composition and the second composition are different.

16. The method of claim 15, wherein said liquid contained in said first composition further comprises a dispersive liquid.

17. The method of claim 16, wherein said dispersive liquid further comprises a liquid containing charged particles.

18. The method of claim 17, wherein said charged particles further comprise white particles.

19. The method of claim 17, wherein said charged particles further comprise titanium dioxide particles.

20. The method of claim 15, wherein said first composition containing a liquid contains a dye dissolved therein.

21. The method of claim 15, wherein said discharge device further comprises an ink jet device.

* * * * *